(12) United States Patent
Burke et al.

(10) Patent No.: US 8,460,553 B2
(45) Date of Patent: Jun. 11, 2013

(54) RECOVERY BY VAPOR RECOMPRESSION OF INDUSTRIAL PROCESS FLUID COMPONENTS

(75) Inventors: John Michael Burke, Kirtland, OH (US); Joseph F. Warchol, Norristown, PA (US); Tom N. Demopolis, Collegeville, PA (US)

(73) Assignee: Houghton Technical Corp., Wilmington, DE (US)

( * ) Notice: Subject to any disclaimer, the term of this patent is extended or adjusted under 35 U.S.C. 154(b) by 400 days.

(21) Appl. No.: 12/666,145

(22) PCT Filed: Jun. 24, 2008

(86) PCT No.: PCT/US2008/067964
§ 371 (c)(1),
(2), (4) Date: Sep. 17, 2010

(87) PCT Pub. No.: WO2009/002954
PCT Pub. Date: Dec. 31, 2008

(65) Prior Publication Data
US 2011/0021837 A1    Jan. 27, 2011

Related U.S. Application Data

(60) Provisional application No. 60/937,087, filed on Jun. 25, 2007.

(51) Int. Cl.
*B01D 61/14*    (2006.01)
*B01D 61/16*    (2006.01)

(52) U.S. Cl.
USPC ............................ 210/651; 210/648; 210/650

(58) Field of Classification Search
None
See application file for complete search history.

(56) References Cited

U.S. PATENT DOCUMENTS

| 5,137,654 | A  | 8/1992  | Burke      |
|-----------|----|---------|------------|
| 6,365,005 | B1 | 4/2002  | Schleiffarth |
| 6,508,936 | B1 | 1/2003  | Hassan     |
| 6,599,356 | B2 | 7/2003  | Komatsu    |
| 2,395,946 | A1 | 6/2004  | Altmann    |
| 6,783,682 | B1 | 8/2004  | Awerbuch   |
| 6,818,609 | B2 | 11/2004 | Blithe     |
| 2006/0032630 | A1 | 2/2006 | Heins      |
| 2006/0237366 | A1 | 10/2006 | Al-Mayahi |

FOREIGN PATENT DOCUMENTS

| WO | WO 92/01380    | 2/1992 |
| WO | WO-2006/072122 | 7/2006 |

OTHER PUBLICATIONS

Manufactruing Engineering and Materials Processing (2006), 71 (Metalworking Fluids (2$^{nd}$ ed.)), Chapter 13, p. 301-324.*
Database CAPLUS on STN, Acc. No. 1985:28135, Hayashi et al., JP 59149995 A (Aug. 28, 1984) (abstract).*
Database CAPLUS on STN, Acc. No. 1985:117974, PAULUS, Tribologia e Lubrificazione (1984), 19(2), p. 67-73 (abstract).*
Burke, "Reduction of biochemical oxygen demand and chemical oxygen demand of metalworking fluid wastewater by electrochemical oxidation", Society of Tribologist and Lubrication Engineers, 59$^{th}$ Annual Meeting (May 19, 2004).
Green, "Evaporators", Perry's Chemical Engineers' Handbook, 6th Ed., McGraw-Hill Book Company, New York, New York, pp. 11-31 to 11-43 (1984).
Labrecque, "Treating Wastewater: Combine membranes with mechanical vapor recompression", in Environmental Management: Wastewater and Groundwater Treatment, Suzanne Shelley, Ed., Chemical Engineering, pp. 51-54 (Feb. 2004).
"Membrane Technology", in Kirk-Othmer Encyclopedia of Chemical Technology, 4th Ed, vol. 16, pp. 169-170 (1995).
International Search Report dated Sep. 5, 2008 in corresponding International Application No. PCT/US08/67964.
International Preliminary Report on Patentability dated Jan. 5, 2010 in corresponding International Application No. PCT/US08/67964.
Hyatt, "The development of evaporators for advance-base thermocompression sea-water stills", Summary Report for Nov. 15, 1955 to Mar. 15, 1957, Accession No. AD0255272, Armed Services Technical Information Agency (available to the public in Mar. 2006).
Hyatt, "The development of advance-base thermocompression sea-water stills", Quarterly Report No. 12, Accession No. AD0255270, US Naval Civil Engineering Research and Evaluation Laboratory (available to the public in Mar. 2006).
International Search Report dated Jul. 5, 2011 issued in corresponding European Patent Application No. 08771775.7.
Sun Oil "SUNOCO", Technical Bulletin #34—Disposal of Waste Cutting Oil Emulsions (1970).
Burke, "The Function of Coolant Management in a Major Corporation", in Lubrication Challenges in Metalworking and Processing, Proceedings Second International Conference, IIT Research Center, pp. 195-202 (Jun. 27-29, 1979).
Napier, "Waste Treatability of Aqueous-Based Synthetic Metalworking Fluids", Journal of the American Society of Lubrication Engineers, 41(6):361-365 (Jun. 1985).
Burke, "Waste Treatment of Metalworking Fluids, A Comparison of Three Common Methods ©", Journal of the Society of Tribologists and Lubrication Engineers, pp. 238-246 (Apr. 1991).
Miller, "Methods of Reducing Chemical Oxygen Demand of Metalworking Fluids After Pre-Treatment by Membrane Separation", Society of Manufacturing Engineers Technical Paper, MR93-156 (1993).
Gach, "Membrane Filtration for Metalworking Waste Fluid Treatment", Society of Manufacturing Engineers, 10(2):1-7 (1999).

(Continued)

*Primary Examiner* — Brian J Davis
(74) *Attorney, Agent, or Firm* — Howson & Howson LLP

(57) ABSTRACT

The invention provides the combined use of UF and MVR for the treatment of industrial process fluid wastewater that contains recoverable material. The recoverable material desirably has a molecular diameter of less than about 5 to 6 nm and a boiling point of less than about 200 ° C. In one embodiment, the recoverable material may then be utilized in the preparation of another industrial process fluid. In another embodiment, the recoverable material is isolated and retained for later use. The invention thereby provides aqueous industrial process fluid which contains water; one or more of an emulsifier, oil, amine, biocide, thickener, lubricant, dispersant, antioxidant, corrosion inhibitor, alkaline compound, surfactant, and carrier; and one or more chemical compounds recovered from aqueous industrial process fluid wastewater treated with UF and MVR.

24 Claims, 2 Drawing Sheets

OTHER PUBLICATIONS

Muszynski, "Biological and Electrochemical Treatment of Used Metalworking Fluids: A Toxicity-Reduction Evaluation", Archives of Environmental Contamination and Toxicology, 52(4):483-488 (May 2007).

Office Action dated Jul. 17, 2012 and issued in corresponding European Patent Application No. 08771775.7.

* cited by examiner

RECOVERY BY VAPOR RECOMPRESSION OF INDUSTRIAL PROCESS FLUID COMPONENTS

CROSS REFERENCE TO RELATED APPLICATIONS

This application is a US national stage of International Patent Application No. PCT/US2008/067964, filed Jun. 24, 2008, which claims the benefit of the priority of U.S. Provisional Application No. 60/937,087, filed Jun. 25, 2007. These priority applications are hereby incorporated by reference in their entirety.

BACKGROUND OF THE INVENTION

Mechanical vapor recompression (MVR), also known as vapor compression distillation, is utilized in industry as an efficient distillation technique to remove and/or isolate water from industrial process fluid wastewater. The use of MVR to treat wastewater from an industrial process permits the recycling of the treated water and reduces waste disposal, thereby conserving costs of environmental clean-up. Further, any water removed via MVR can be reused in the same industrial process, which also conserves costs.

MVR has been utilized alone or in conjunction with ultrafiltration (UF) for processing industrial process wastewater. See, Labrecque et al., Chem. Eng., February, 2004. UF is useful for the removal of larger molecular diameter chemical compounds from industrial process fluid wastewater.

While MVR and/or UF are two processes that have been previously independently utilized to recover water from industrial process waste streams, there remains a need in the art for processes utilizing MVR and UF for treating industrial process fluids for the purpose of recovering useful materials, other than water, from the wastewater.

SUMMARY OF THE INVENTION

Figure 1:
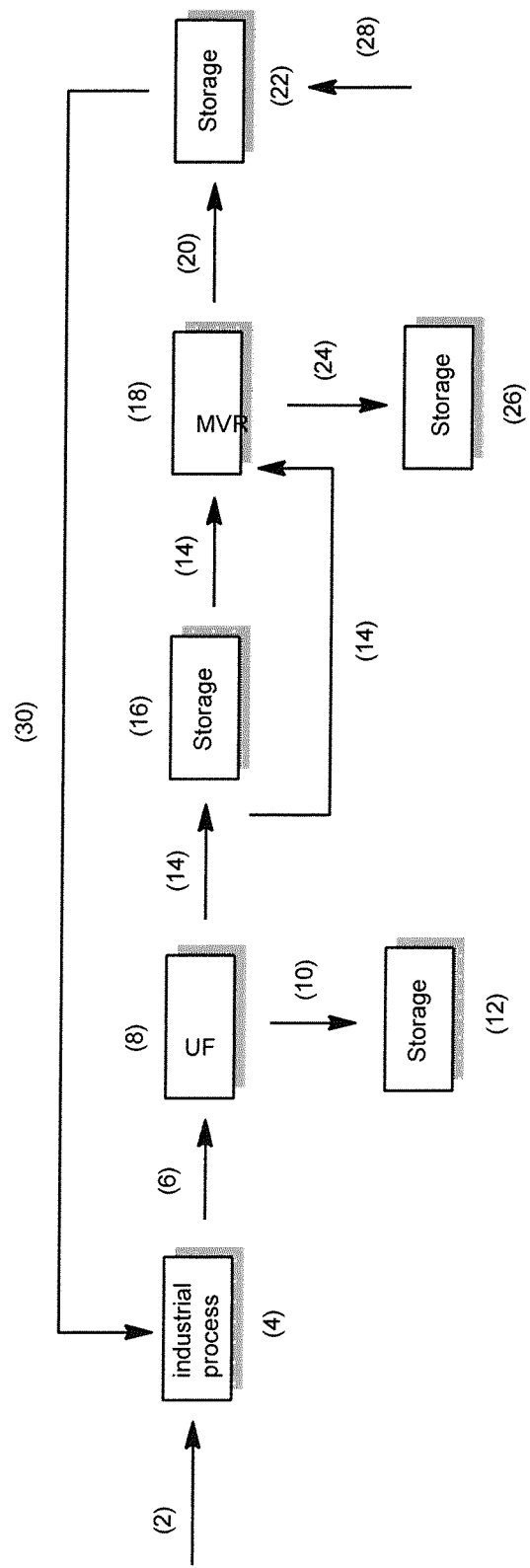
FIG. 1 provides a block diagram flow schematic of a general process for treating industrial process fluid wastewater which contains a recoverable material.

In one aspect, processes for treating hard surfaces, such as metals, with an aqueous industrial process fluid containing recoverable material are provided. In one embodiment, a process for treating a surface with an aqueous industrial process fluid comprising recoverable material is provided and the process includes (i) contacting a surface with said aqueous industrial process fluid containing recoverable material; (ii) treating the aqueous industrial process fluid wastewater containing recoverable material with ultrafiltration; (iii) treating the aqueous industrial process fluid wastewater containing recoverable material with mechanical vapor recompression; (iv) recovering the recoverable material from the aqueous industrial process fluid wastewater; and (v) treating a surface using the recoverable material. In another embodiment, a process is provided for treating a surface with an aqueous industrial process fluid containing recoverable material and the process includes (i) contacting a surface with the aqueous industrial process fluid containing recoverable material; (ii) treating the aqueous industrial process fluid wastewater containing recoverable material with ultrafiltration to remove particulates of the aqueous industrial process fluid wastewater having a molecular diameter greater than about 6 nm; (iii) treating the aqueous industrial process fluid wastewater containing recoverable material with mechanical vapor recompression, wherein the recoverable materials are soluble in water, dispersible in water, or azeotrope with water and do not degrade at temperatures of less than about 200° C.; (iv) recovering the recoverable material from the aqueous industrial process fluid wastewater; and (v) treating a surface using the recoverable material.

In a further aspect, processes are provided for preparing an aqueous industrial process fluid containing a recoverable material. In one embodiment, a process for preparing an aqueous industrial process fluid containing a recoverable material is provided and the process includes (i) contacting a surface with the aqueous industrial process fluid wastewater containing a recoverable material; (ii) treating the aqueous industrial process fluid wastewater containing recoverable material with ultrafiltration; (iii) treating the aqueous industrial process fluid wastewater containing recoverable material with mechanical vapor recompression; (iv) isolating the recoverable material; and (iv) combining the recoverable material with unprocessed aqueous industrial process fluid. In a further embodiment, a process is provided for preparing an aqueous industrial process fluid containing a recoverable material, the process including (i) contacting a surface with the aqueous industrial process fluid containing a recoverable material; (ii) treating the aqueous industrial process fluid wastewater containing recoverable material with ultrafiltration to remove particulates of the aqueous industrial process fluid wastewater having a molecular diameter greater than about 6 nm; (iii) treating the aqueous industrial process fluid wastewater containing recoverable material with mechanical vapor recompression, wherein the recoverable materials are soluble in water, are dispersible in water, or azeotrope in water; (iv) isolating the recoverable material; and (iv) combining the recoverable material with unprocessed aqueous industrial process fluid.

In another aspect, processes for removing recoverable material from aqueous industrial process fluid wastewater containing the recoverable material are provided. In one embodiment, a process for removing recoverable material from aqueous industrial process fluid wastewater containing the recoverable material is provided and includes (i) treating the aqueous industrial process fluid wastewater containing recoverable material with ultrafiltration; (ii) treating the aqueous industrial process fluid wastewater containing recoverable material by mechanical vapor recompression; and (iii) collecting the recoverable material; wherein the recoverable material contains water and one or more components of aqueous industrial process fluid. In another embodiment, a process is provided for removing recoverable material from aqueous industrial process fluid wastewater containing the recoverable material, the process including (i) treating the aqueous industrial process fluid wastewater containing recoverable material with ultrafiltration to remove particulates of the aqueous industrial process fluid wastewater having a molecular diameter greater than about 6 nm; (ii) treating the aqueous industrial process fluid wastewater containing recoverable material by mechanical vapor recompression, wherein the recoverable materials are soluble in water, dispersible in water, or azeotrope with water and do not degrade at temperatures of less than about 200° C.; and (iii) collecting the recoverable material; wherein the recoverable material contains water and one or more components of aqueous industrial process fluid.

In yet another aspect, methods for removing N,N-diethylethanolamine, methoxypropylamine, or a combination thereof from aqueous industrial process fluid wastewater containing one or more of these amines are provided. In one embodiment, a method for removing N,N-diethylethanolamine, methoxypropylamine, or a combination thereof from aqueous industrial process fluid wastewater containing the N,N-diethylethanolamine, methoxypropylamine, or a combination thereof is provided and includes (i) treating the aqueous industrial process fluid wastewater containing N,N-diethylethanolamine, methoxypropylamine, or a combination thereof with ultrafiltration; (ii) treating the aqueous industrial process fluid wastewater containing N,N-diethylethanolamine, methoxypropylamine, or a combination thereof by mechanical vapor recompression; and (iii) collecting the N,N-diethylethanolamine, methoxypropylamine, or a combination thereof.

In a further aspect, methods for removing biocides from aqueous industrial process fluid wastewater containing one or more of these biocides are provided.

In still a further aspect, an aqueous industrial process fluid is provided which contains one or more chemical compounds which were recovered from aqueous industrial process fluid wastewater by a process combining the steps of ultrafiltration and mechanical vapor recompression, as described herein. In one embodiment, an aqueous industrial process fluid is provided which contains (i) water; (ii) one or more of an emulsifier, oil, amine, thickener, lubricant, dispersant, antioxidant, corrosion inhibitor, alkaline compound, surfactant, and carrier; and (iii) one or more chemical compounds recovered from aqueous industrial process fluid wastewater treated with ultrafiltration and mechanical vapor recompression.

In yet a further aspect, methods are provided for preparing aqueous industrial process fluids which contain one or more chemical compounds characterized by an aqueous solubility, molecular weight/diameters and distillation temperature, that enables the one or more components to be recovered in a process using MVR and UF.

In another aspect, methods are provided for designing an aqueous industrial process fluid which contains recoverable material. In one embodiment, a method for designing an aqueous industrial process fluid containing recoverable material is provided and includes (a) selecting a recoverable material which (i) is water-soluble, forms an azeotrope with water, or is dispersible in water; and (ii) does not degrade or oxidize under conditions of mechanical vapor recompression; and (b) preparing aqueous industrial process fluid using the recoverable material.

Other aspects and advantages of the invention will be readily apparent from the following detailed description of the invention.

DETAILED DESCRIPTION OF THE INVENTION

The processes described herein are useful for recovering valuable chemical compounds contained in industrial process fluid wastewater. While it is known in the art that industrial process fluid wastewater contains valuable chemical compounds that, if recovered from the wastewater could be used again, it was unknown how to recover these valuable chemical compounds. The inventors therefore designed methods for removing these valuable chemical compounds. In doing so, the inventors were able to tailor industrial fluids containing valuable chemical compounds for customers. In some embodiments of the methods, the valuable chemical compounds are isolated and re-used by the customer. In other embodiments, the valuable chemical compounds are removed from the industrial process wastewater and stored for future use. In further embodiments, the valuable chemical compounds are removed and thereby do not contribute to chemical oxygen demand (COD) or biochemical oxygen demand (BOD) as compared to when traditional treatment methods are used.

The recovery of one or more valuable chemical compounds from industrial process fluid wastewater is environmentally beneficial since less wastewater must be discarded into the environment. Further, the recovery of valuable chemical compounds from industrial process fluid wastewater is cost effective for two reasons. One, material recovered from industrial process fluid wastewater reduces the amount, volume and mass of waste for disposal following the performance of industrial processes. Second, the valuable chemical compounds recovered from industrial process fluid wastewater, including water, may be reused to prepare a "recycled" industrial process fluid, thereby permitting the purchase of less industrial process fluid and the components thereof.

As described herein, the inventors found that mechanical vapor recompression (MVR), optionally in combination with ultrafiltration (UF), may be utilized to isolate recoverable materials, in addition to water present in industrial process fluid wastewater. When MVR and UF are utilized together, the specific order of the UF and MVR components and/or steps does not limit the processes described herein. In one embodiment, the aqueous industrial process fluid wastewater is first treated using UF and then treated with MVR. In another embodiment, the industrial process fluid wastewater is first treated using MVR and then treated using UF. In a further embodiment, the industrial process fluid wastewater is first treated using MVR, then treated using UF, and finally treated using a second UF. In still another embodiment, the industrial process fluid wastewater is first treated using UF, then treated using MVR, and finally treated using a second UF.

Although the methods described herein relate to the recovery of valuable products using UF and MVR, the invention is not so limited to only these two types of equipment. One of skill in the art would readily be able substitute one or both of the UF and MVR techniques/equipment with other techniques/equipment which provides similar results. For example, equipment utilized to perform reverse osmosis, nanofiltration, microfiltration, among others, may be utilized in place of the UF equipment.

A. Methods for Isolating Recoverable Materials

The term "industrial process fluid" as used herein refers to any fluid that uses water as the continuous phase in an industrial process. Industrial process fluid may thereby include true solutions, dispersions, emulsions, among others. Specifically, the industrial process fluid is utilized to operate machinery of an industrial process. In one embodiment, industrial process fluid refers to metal working fluids. In one example, metal working fluids are utilized in industries for rolling metals, such as aluminum and steel. In another embodiment, industrial process fluid refers to metal removal fluids. In one example, metal removal fluids are utilized in industries for removing metal from a surface either by chemical or mechanical means, such as cutting and grinding, among others. In a further embodiment, industrial process fluid refers to aqueous washer fluid. In one example, aqueous fluid cleaners are utilized in industries for removing soils in which a hard surface, e.g., a metal, is sprayed or soaked with one or more chemical cleaning compounds.

The term "hard surface" as used herein refers to any surface which may be treated using an aqueous solution. For example, the treatment may involve removing undesirable components from the hard surface, e.g., soils. Desirably, the hard surface is capable of being treated, e.g., cleaned, rolled, or ground, using the aqueous solution. In one embodiment, the hard surface is metal, ceramic, glass, wood, cloth, among others. A "soft surface" or "porous surface", i.e., natural and synthetic fibers such as cloth and paper, may also be treated using the methods described herein. One of skill in the art would readily be able to determine if a particular surface is a "hard surface", "soft surface", or "porous surface" which may be utilized in the methods described herein.

In one embodiment, industrial process fluid may contain, without limitation, one or more oil, including mineral oil, water, ester, carboxylic acid, surfactant, fatty acid, emulsifier, amine, thickener, lubricant, dispersant, antioxidant, corrosion inhibitor, alkaline compound, builder, solvent, biocide, surfactant, or carrier, among others. In a further embodiment, industrial process fluid contains water and one or more recoverable material. In another embodiment, industrial process fluid contains oil, oleic acid, one or more biocide, and/or one or more amine. In still another embodiment, industrial process fluid contains one or more amine. In a further embodiment, industrial process fluid contains water and one or more amine. In yet a further embodiment, the industrial process fluid contains oil, oleic acid, and one or more amine. In yet another embodiment, the industrial process fluid contains one or more biocide. See, for example the industrial process fluid components described in U.S. Pat. No. 6,818,609, which is hereby incorporated by reference.

The terms "used industrial process fluid" or "processed industrial process fluid" or variations thereof as used herein are interchangeable and refer to industrial process fluid that has been utilized at least once for one or more of the intended industrial purposes described above. Similarly, the terms "new industrial process fluid" or "unprocessed industrial process fluid" or variations thereof as used herein are interchangeable and refer to industrial process fluid that has not previously been utilized in any industrial process.

The term "industrial process fluid wastewater" as used herein refers to the fluid or wastewater that is collected after use of industrial process fluid in an industrial process. Typically, the wastewater is aqueous. Desirably, the industrial process fluid wastewater contains one or more of a recoverable material.

The term "recoverable material" as used herein refers to a chemical compound that is recovered or separated from a used industrial process fluid, i.e., azeotroped or steam distilled, among others. The term "valuable chemical compound" refers to one such recoverable material. In one embodiment, the recoverable material or valuable chemical compound is soluble in water. In another embodiment, the recoverable material or valuable chemical compound is dispersible in water, i.e., can pass through the UF. In still another embodiment, the recoverable material or valuable chemical compound forms an azeotrope with water. In a further embodiment, the recoverable material or valuable chemical compound has a size which is smaller than the globular protein standard described in Kirk-Othmer Encyclopedia of Chemical Technology, $4^{th}$ Ed., 16:16-170 (1995), which is hereby incorporated by reference. One of skill in the art would readily understand that the globular protein standard has a molecular weight of about 50 kD, a molecular diameter of about 5 to about 6 nm, and is not capable of passing through a standard membrane of an ultrafiltration unit. For example, the materials in an industrial process fluid having a molecular diameter of greater than about 5 to about 6 nm cannot pass through the ultrafiltration membrane.

The recoverable material or valuable chemical compound is desirably smaller than the globular protein standard, i.e., having a molecular diameter of less than about 5 to about 6 nm. In one embodiment, the recoverable material has a molecular diameter of less than about 5 to about 6 nm. In another embodiment, the recoverable material has a molecular diameter of less than about 5, 5.1, 5.2, 5.3, 5.4, 5.5, 5.6, 5.7, 5.8, 5.9, and 6.0, or fractional diameters therebetween. In a further embodiment, the recoverable material has a molecular diameter of about 0.001 to about 6 nm, about 0.1 to about 6 nm, about 1 to about 6 nm, about 2 to about 6 nm, about 3 to about 6 nm, about 4 to about 6 nm, among other ranges and including fractional integers therebetween. In one embodiment, when the processes are utilized to recover materials of this size, UF is omitted from the method. In other embodiments, when the processes are utilized to recover materials of this size, UF is performed prior or subsequent to MVR.

In embodiments in which the recoverable material or valuable chemical compound is larger than the globular protein standard, i.e., having a molecular diameter of greater than about 5 to about 6 nm, MVR is desirably utilized prior to UF. In one embodiment, the recoverable material has a molecular diameter of greater than about 6 nm. In another embodiment, the recoverable material has a molecular diameter of greater than about 6, 7, 8, 9, 10, 15, 20, 25, 30, 35, 40, 45, 50, 55, 60, 65, 70, 75, 80, 85, 90, 95, and 100 nm, or fractional diameters therebetween. It is also desirable that the recoverable material does not degrade or oxidize under conditions of mechanical vapor recompression. The term "degrade" as used herein refers to the breaking of one or more bonds of a chemical compound, thereby destroying the chemical compound. In one embodiment, the recoverable material is stable up to temperatures of about 200° C., i.e., the recoverable material does not degrade at temperatures up to about 200° C. It is further desirable that the recoverable material be capable of passing through the MVR unit. In one embodiment, the recoverable material is liquid. In another embodiment, the recoverable material is a solid at ambient conditions, but sublimes under the MVR conditions. In one example, the recoverable material has a boiling point of at least about 30° C. In a further example, the recoverable material has a boiling point of about 50 to about 200° C. In another example, the recoverable material has a boiling point of about 60 to about 180° C. In a further example, the recoverable material has a boiling point of about 70 to about 160° C. It yet another example, the recoverable material has a boiling point of about 80 to about 140° C. In still a further example, the recoverable material has a boiling point of about 90 to about 120° C. In another example, the recoverable material has a boiling point of about 100 to about 110° C. In yet another example, the recoverable material has a boiling point of about 50, 60, 70, 80, 90, 100, 110, 120, 130, 140, 150, 160, 170, 180, or 190° C., or fractional degree increments therebetween.

It is further beneficial that the recoverable material or valuable chemical compound be water-soluble, form an azeotrope with water, or be dispersible in water. However, the term "recoverable material" does not include water as the only component. Instead, the recoverable material contains water and one or more additional recoverable materials or valuable chemical compounds. In one example, the recoverable material contains water, i.e., is admixed with water, and at least one additional recoverable material. In another example, the recoverable material contains water and one or more of a carboxylic acid, ester, amine, surfactant, biocide such as a phenol, or fatty acid.

In one embodiment, the recoverable material contains water and one or more of an amine. The inventors hypothesized that amines having reduced hydrogen bonding were more easily recovered using the UF/MVR methods described herein as compared to amines having larger amounts of hydrogen bonding. This is illustrated by way of Example 1 and could be determined by one of skill in the art using the description provided herein. The term "reduced hydrogen bonding" as used herein refers to an amine having a minimal number of H-atoms capable of hydrogen bonding with electronegative atoms on other chemical molecules present in the industrial fluid wastewater. Desirably, an amine having "reduced hydrogen bonding" has less H-atoms, which are capable of hydrogen bonding, than ethylenediamine or monoethanolamine. In a further example, the recoverable material is an amine. In another example, the recoverable material is a water soluble amine. In yet another example, the recoverable material is N,N-diethylethanolamine, methoxypropylamine, or a combination thereof.

In still a further example, the recoverable material contains one or more of a biocide. In yet a further example, the recoverable material is a phenol or a phenolic biocide. In still another example, the recoverable material is parachloro-meta cresol or ortho-phenylphenol.

A variety of UF apparatuses may be selected by one of skill in the art including the UF equipment discussed in Labrecque et al., Chem. Eng., February, 2004, which is hereby incorporated by reference. The UF component of the process permits the passage of chemical compounds having a molecular diameter of less than about 5 to about 6 nm as described above. In one embodiment, recoverable materials having a molecular diameter of less than about 5 to about 6 nm pass through the membrane of the UF unit. Recoverable materials that pass through the membrane of the UF unit may either be stored for later treatment by MVR or immediately treated using MVR. For example, chemical compounds having a molecular diameter of less than about 5 to about 6 nm may be stored in a holding tank. The processes described herein may include one or more "polishing" UF steps, i.e., 1, 2, 3, 4, or more. These "polishing" UF steps are typically performed to further purify the recoverable material. Desirably, any "polishing" UF steps are performed at the end of the process, i.e., after treatment of the wastewater, using MVR or MVR/UF.

In addition to permitting the passage of compounds having a molecular diameter of less than about 5 to about 6 nm, UF separates and retains chemical compounds from the wastewater having a molecular diameter of greater than about 6 nm. In one embodiment, the chemical compounds having a molecular diameter greater than about 6 nm are by-products and are typically disposed of as waste. In a further embodiment, the chemical compounds having a molecular diameter greater than about 6 nm and are removed using UF are collected and stored for later use. In another embodiment, the chemical compounds having a molecular diameter greater than about 6 nm, and are removed using UF, include oils, which can be used as fuel.

The terms MVR and vapor compression distillation as used herein are interchangeable. A variety of MVR apparatuses may be selected by one of skill in the art and include the MVR equipment discussed in Labrecque et al., Chem. Eng., February, 2004. The MVR step of the process permits the recovery of one or more recoverable materials from the wastewater that boil at a temperature of less than about 200° C. In one embodiment, the MVR permits recovery of one or more chemical compounds from the wastewater having a boiling point of about 50 to about 200° C. In another embodiment, the MVR permits recovery of one or more chemical compounds from the wastewater having a boiling point of about 60 to about 180° C. In a further embodiment, the MVR permits recovery of one or more chemical compounds from the wastewater having a boiling point of about 70 to about 160° C. It yet another embodiment, the MVR permits recovery of one or more chemical compounds from the wastewater having a boiling point of about 80 to about 140° C. In still a further embodiment, the MVR permits recovery of one or more chemical compounds from the wastewater having a boiling point of about 90 to about 120° C. In another embodiment, the MVR permits recovery of one or more chemical compounds from the wastewater having a boiling point of about 100 to about 110° C. In yet another embodiment, the MVR permits recovery of one or more chemical compounds from the wastewater having a boiling point of about 50, 60, 70, 80, 90, 100, 110, 120, 130, 140, 150, 160, 170, 180, 190, 200° C., or fractional degrees increments therebetween. Desirably, the recoverable material does not degrade or oxidize under the MVR conditions. Typically, the distillate obtained after treating the wastewater with MVR contains the recoverable material.

Compounds having a boiling point of greater than about 200° C. are not typically distilled using the MVR component of the process and are collected after MVR. However, compounds having a boiling point above 200° C. and that can azeotrope with water may be recovered using the processes described herein. In another embodiment, compounds that are capable of being steam distilled, i.e., can azeotrope with water, may be recovered using the processes described herein. Further, any compounds that degrade during MVR are collected after MVR and disposed of as waste.

In one embodiment, the combination of UF and MV permits the recovery of recoverable materials that are soluble in water, have a molecular diameter of less than about 5 to about 6 nm, and have a boiling point of less than about 200° C.

One or more of the components of the recoverable materials may be isolated. In one embodiment, one or more components of the recoverable material may be isolated using techniques known to those skilled in the art including, without limitation, alternative or additional distillation steps. In a further embodiment, the water, which may be disposed of, or retained for later use, may be separated from the recoverable material. In another embodiment, the isolated material is then combined with unprocessed aqueous industrial process fluid.

FIG. 1 provides one example of a process for treating aqueous industrial process fluid wastewater. In this figure, industrial process fluid (2) is utilized in an industrial process (4). The aqueous industrial process fluid wastewater (6) is sent to ultrafiltration (8). The components of the wastewater having a molecular diameter of greater than about 6 nm (10) are collected in storage tank (12). The components of the wastewater having a molecular diameter of less than about 5 to about 6 nm (14) are sent to storage tank (16) which are sent to MVR (18). Alternatively, the components of the wastewater having a molecular diameter of less than about 5 to about 6 nm (14) are sent directly to MVR (18). The components of the wastewater that may be distilled by the MVR (20) are sent to storage tank (22). The components of the wastewater that decompose during MVR (20) or have a boiling point greater than about 200° C. are sent to storage (26) for disposal. Additional chemicals (28) are added to (22) to form a recyclable industrial process fluid (30) which can be utilized in industrial process (4).

Figure 2:
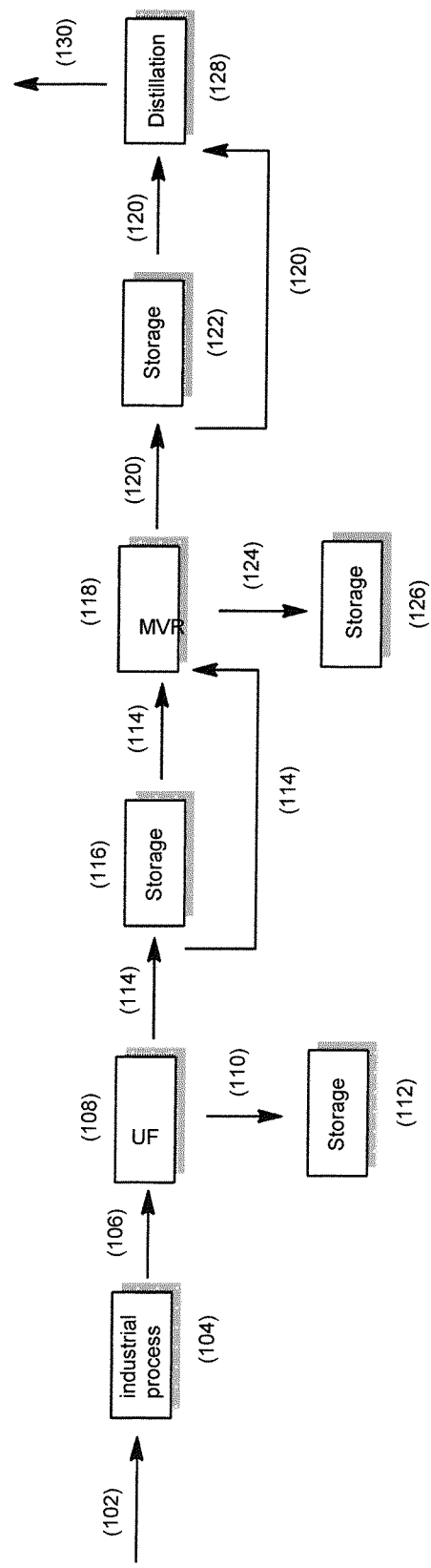
FIG. 2 provides a block diagram flow schematic of a general process for recovering a material from industrial fluid process wastewater.

FIG. 2 provides another example of a process for treating aqueous industrial process fluid wastewater. In this figure, industrial process fluid (102) is utilized in an industrial process (104). The aqueous industrial process fluid wastewater (106) is sent to ultrafiltration (108). The components of the wastewater having a molecular diameter of greater than about 6 nm (110) are collected in storage tank (112) for disposal. The components of the wastewater having a molecular diameter of less than about 5 to about 6 nm (114) are sent to storage tank (116) and then to MVR (118). Alternatively, the components of the wastewater having a molecular diameter of less than about 5 to about 6 nm (114) are sent directly to MVR (118). The components of the wastewater that may be distilled by the MVR (120) are sent to storage tank (122). The components of the wastewater that decompose during MVR (124) or have a boiling point greater than about 200° C. (124) are sent to storage (126) for disposal. The recoverable materials (130) in (120) are isolated using an additional distillation (128).

In one example, a process is provided for removing recoverable material from aqueous industrial process fluid wastewater containing the recoverable material. The process includes treating the aqueous industrial process fluid wastewater containing recoverable material with ultrafiltration; treating the aqueous industrial process fluid wastewater containing recoverable material using mechanical vapor recompression; and collecting the recoverable material; wherein the recoverable material contains water and one or more components of aqueous industrial process fluid.

In a further example, a process for removing recoverable material from aqueous industrial process fluid wastewater containing the recoverable material is provided. The process includes treating the aqueous industrial process fluid wastewater containing recoverable material with ultrafiltration to remove particulates of the aqueous industrial process fluid wastewater having a molecular diameter greater than about 6 nm; treating the aqueous industrial process fluid wastewater containing recoverable material by mechanical vapor recompression, wherein the recoverable materials are soluble in water, dispersible in water, or azeotrope with water and do not degrade at temperatures of less than about 200° C.; and collecting the recoverable material, wherein the recoverable material contains water and one or more components of aqueous industrial process fluid.

In another example, a method for removing N,N-diethylethanolamine, methoxypropylamine, or a combination thereof from aqueous industrial process fluid wastewater containing N,N-diethylethanolamine, methoxypropylamine, or a combination thereof is provided. The method includes treating the aqueous industrial process fluid wastewater containing N,N-diethylethanolamine, methoxypropylamine, or a combination thereof using ultrafiltration; treating the aqueous industrial process fluid wastewater containing N,N-diethylethanolamine, methoxypropylamine, or a combination thereof using mechanical vapor recompression; and collecting the N,N-diethylethanolamine, methoxypropylamine, or a combination thereof.

B. Methods of Using Recovered Materials

The recoverable material and water isolated from the wastewater may be utilized in the preparation of aqueous industrial process fluid. Desirably, some of the recoverable material in the industrial process fluid is isolated using the UF/MVR techniques described herein. In one embodiment, the recoverable material may be transferred to a holding tank for later use. In another embodiment, the recoverable material may be directly combined with more aqueous industrial fluid. In a further embodiment, the recoverable material may be analyzed to determine the contents thereof and additional chemical compounds added thereto to prepare an aqueous industrial fluid. One of skill in the art would readily be able to analyze the recoverable materials to determine the components of the same using techniques known in the art including, without limitation, chromatography, such as high performance liquid chromatography (HPLC) and thin layer chromatography (TLC), gas chromatography (GC), mass spectral (MS) analysis, infrared (IR) spectroscopy, combinations thereof, among others.

Water that is isolated using the techniques described herein may be recycled for use in the same industrial process alone or may be combined with new or used industrial process fluid. Alternatively, the water isolated as described herein may be disposed of using any techniques known in the art. In fact, it is an advantage of the combined use of UF and MVR using the processes described herein that provides water that is substantially free of other recoverable materials, thereby permitting its easy disposal, i.e., release into the environment according to governmental regulations. Desirably, the disposal of water isolated using the processes described herein is inexpensive.

The recoverable materials (or the industrial process fluids that contain the recoverable materials) isolated using the UF/MVR processes described herein can be utilized in their intended applications, such as in the treatment of hard surfaces, such as metals. Alternatively, the recoverable materials (or the industrial process fluids that contain the recoverable materials) isolated using the UF/MVR processes described herein can be stored together or separately. The processes include contacting a hard surface, such as a metal, with aqueous industrial process fluid that contains recoverable material isolated as described herein.

These processes provide aqueous industrial process fluids. These aqueous industrial process fluids contain water; one or more of an emulsifier, oil, amine, thickener, lubricant, dispersant, antioxidant, corrosion inhibitor, alkaline compound, surfactant, and carrier; and one or more chemical compounds recovered from aqueous industrial process fluid wastewater treated with UF and MVR as discussed above. In one embodiment, the chemical compounds which may be recovered from aqueous industrial process fluid wastewater include biocides, such as phenols including parachloro-meta cresol and ortho-phenylphenol.

In one example, an aqueous industrial process fluid is provided and contains water; one or more of an emulsifier, oil, amine, thickener, lubricant, dispersant, antioxidant, corrosion inhibitor, alkaline compound, surfactant, biocide, and carrier; and one or more chemical compounds recovered from aqueous industrial process fluid wastewater treated with ultrafiltration and mechanical vapor recompression.

In another example, a process for treating hard surfaces, such as metals, with an aqueous industrial process fluid containing recoverable material is provided. The process includes contacting any hard surface, such as a metal, with the aqueous industrial process fluid containing recoverable material. The aqueous industrial process fluid wastewater containing recoverable material is then treated using ultrafiltration to remove particulates of the aqueous industrial process fluid wastewater having a molecular diameter greater than about 6 nm. The aqueous industrial process fluid wastewater containing recoverable material is also treated using mechanical vapor recompression, wherein the recoverable materials are soluble in water, dispersible in water, or azeotrope with water, and do not degrade at temperatures of less than about 200° C. The recoverable material from the aqueous industrial process fluid wastewater is then recovered and may be utilized for treating a hard surface, such as metal, or may be stored for later use.

In yet another example, a process for preparing an aqueous industrial process fluid containing a recoverable material is provided. The process includes contacting a hard surface, such as a metal, with the aqueous industrial process fluid containing a recoverable material. The aqueous industrial process fluid wastewater containing recoverable material is treated with ultrafiltration. The aqueous industrial process fluid wastewater containing recoverable material is also treated using mechanical vapor recompression, wherein recoverable material is isolated. The recoverable material is then combined with unprocessed aqueous industrial process fluid.

In still a further example, a process for preparing an aqueous industrial process fluid containing a recoverable material is provided. The process includes contacting a hard surface, such as a metal, with the aqueous industrial process fluid containing a recoverable material. The aqueous industrial process fluid wastewater containing the recoverable material is then treated using ultrafiltration to remove particulates of the aqueous industrial process fluid wastewater having a molecular diameter greater than about 6 nm. The aqueous industrial process fluid wastewater containing recoverable material is then treated using mechanical vapor recompression, wherein the recoverable materials are soluble in water, dispersible in water, or azeotrope with water, and do not degrade or oxidize at temperatures of less than about 200° C. The recoverable materials are then isolated and combined with unprocessed aqueous industrial process fluid.

C. Methods for Designing Industrial Process Fluids

By using the methods described therein, one would be able to design industrial process fluid for a customer given their industrial needs. Desirably, the methods permit the design of aqueous industrial process fluid containing one or more of a recoverable material. In order to design the industrial process fluid, it is necessary to evaluate the needs of the customer, specific industry, government regulations regarding disposal, costs of disposal versus recovery, among other factors. Of the many benefits, the methods described herein permit the recovery of water from industrial process wastewater. Any water recovered from industrial process wastewater can be re-used or disposed of by environmentally acceptable and legal routes.

The crux of designing an industrial process fluid by the methods herein entails the selection of the recoverable material. It is also imperative to determine the extent of isolation of the recoverable material. For example, recoverable materials that can only be recovered in low yields are not usually preferred for designing the industrial process fluid. In one embodiment, a recoverable material which is water-soluble is selected. In another embodiment, a recoverable material which is capable of forming an azeotrope with water is selected. In a further embodiment, a recoverable material which disperses in water is selected. It is also desirable to select a recoverable material which does not degrade or oxidize under conditions of mechanical vapor recompression. It is further desirable to select a recoverable material which has a molecular diameter of less than about 5 to about 6 nm, thereby permitting passage of the same through the membrane of an ultrafiltration unit. Once the recoverable material has been selected, the industrial process fluid is prepared using the same. One of skill in the art would be able to select other suitable chemical compounds for combination with the recoverable material for the industrial process fluid.

The use of the methods described herein permits the design of industrial process fluid which is inexpensive for the customer and environmentally safe. In one embodiment, an industrial process fluid containing water, which may be isolated, is designed. Clearly, re-use of water from industrial process fluid wastewater is not only environmentally encouraged, but is considerably cost-effective for a customer given costs associated with using fresh water samples and/or disposal of contaminated water.

In another embodiment, an industrial process fluid containing water and an amine, which may be isolated, is designed. As discussed above, desirably the amine is water-soluble. In one example, the amine contains reduced hydrogen bonding. In another example, the amine has reduced hydrogen bonding as compared to monoethanolamine or diethanolamine. In a further example, the amine is N,N-diethylethanolamine, methoxypropylamine, or a combination thereof.

In a further embodiment, an industrial process fluid containing water and a biocide which may be isolated is designed. As discussed above, desirably the biocide is water-soluble. In one example, the biocide is a phenol. In another, the biocide is p-chloro-m-cresol, o-phenyl-phenol, or a combination thereof.

In one example, an aqueous industrial process fluid is designed by combining water with one or more components necessary for the particular industrial application, e.g., an emulsifier, oil, amine, thickener, lubricant, dispersant, antioxidant, corrosion inhibitor, alkaline compound, surfactant, biocide, and carrier; and one or more chemical compounds. One or more of these component(s) is selected for characteristics that permit the component(s) to be recovered by the MVR/UF recovery processes described herein. For example, a desirable component is (i) soluble in water, dispersible in water, or azeotropes with water, (ii) has a molecular diameter under about 5 to about 6 nm and (iii) has a boiling point under 200° C. Such a component desirably is amenable to recovery and recovery from the wastewater produced following use in an industrial process by the combination of UF and MVR. For example, such a component is characterized by the chemical bonds which tolerate the recovery steps of MVR and UF. Such components are exemplified by the amines N,N-diethylethanolamine and methoxypropylamine. One of skill in the art, given the teachings of this specification, is believed to be capable of selecting desired components for an industrial process fluid that have the qualities capable of surviving such recovery processes. Thus, for each industrial application, a "designer" industrial process fluid enables the reduced costs and environmental advantages associated with recovery and recycle of these components by the processes described herein.

In a further example, method are provided for designing an aqueous industrial process fluid containing recoverable material, said method including (a) selecting a recoverable material which (i) is water-soluble, forms an azeotrope with water, or is dispersible in water; and (ii) does not degrade or oxidize under conditions of mechanical vapor recompression; and (b) preparing aqueous industrial process fluid using the recoverable material.

The following examples are illustrative only and are not intended to be a limitation on the present invention.

EXAMPLES

Example 1

Treating Industrial Process Fluid Wastewater Containing Recoverable Material

Four (4) industrial process fluid compositions were prepared which contained the components of Table 1. These compositions were further diluted in water to a concentration of about 5 to about 10% by volume. These final aqueous compositions were representative of aqueous industrial process fluid wastewater that may be generated from an industrial process. These compositions were passed through a OSMONICS® spiral wound PAN (polyacrylonitrile) MW series membrane UF unit (GE) which removed the oil and any particles having a molecular diameter of greater than about 6 nm. The wastewater was then passed through a small-scale distillation apparatus which simulated the operation of a VACOM™ VCD2000 MVR unit (Vacom) or a similar unit. The amines were recovered and measured to determine the percentage of recovery following the MVR/UF process.

TABLE 1

| Component | Composition 1 (wt %) | Composition 2 (wt %) | Composition 3 (wt %) | Composition 4 (wt %) | Amine Recovery (%) |
|---|---|---|---|---|---|
| Mineral Oil | 85 | 85 | 85 | 85 | — |
| Oleic Acid | 10 | 10 | 10 | 10 | — |
| N,N-diethylethanolamine | 5 | 0 | 0 | 0 | 100 |
| Monoethanolamine | 0 | 5 | 0 | 0 | 6.5 |
| Methoxypropylamine | 0 | 0 | 5 | 0 | 100 |
| Ethylenediamine | 0 | 0 | 0 | 5 | 13.5 |

The inventors found that N,N-diethylethanolamine and methoxypropylamine, respectively, in industrial process fluid compositions 1 and 3, withstood the UF and MVR conditions and were recovered from the composition in 100% yield. This example illustrates that industrial process fluids containing these amines, as opposed to such process fluids containing amines such as monoethanolamine or ethylenediamine, are amenable to the MVR/UF recovery process and permit the expensive amine components of the process fluid to be recovered and recycled.

Example 2

Reusing Industrial Process Fluid Wastewater Containing Recoverable Material

Industrial process fluid wastewater is treated using a OSMONICS® spiral wound PAN MW series membrane (GE) UF unit to remove particulates having a molecular diameter above about 6 nm. The resultant wastewater containing material having a molecular diameter less than about 5 to about 6 nm is then passed through a small-scale MVR, i.e., distillation apparatus, which simulated the operation of a VACOM™ VCD000 MVR unit (Vacom) or a similar unit. Chemical compounds that degrade during MVR or chemical compounds having boiling points above about 200° C. are not removed. The treated wastewater that contains recoverable materials is collected.

The collected wastewater containing recoverable materials is then analyzed using infrared spectroscopy and wet methods such as titrations to determine the chemical composition of the same. The wastewater containing recoverable materials is then modified by adding one or more components of industrial process fluid to prepare a used or recycled industrial process fluid. This used industrial process fluid is then utilized in an industrial process, thereby saving costs of waste disposal and environmental clean-up, and enabling the reuse of expensive starting materials.

Example 3

Isolating Biocides from Industrial Process Fluid Wastewater Independently using MVR and UF Biocides are frequently added to metalworking formulations to prevent the growth of microorganisms in use. A disadvantage of biocides is their toxicity to the environment, even at low levels (ppm). If the biocide in the metalworking fluid can be recovered and reused, this offers an economic advantage, as well as avoiding being an environmental pollutant.

In this example, metalworking fluid compositions independently containing two (2) biocides were processed separately using MVR and UF to determine if the biocides could be recovered. Specifically, i.e., p-chloro-m-cresol (composition 1) and o-phenyl phenol (composition 2) were independently added to metalworking fluid concentrates and then were diluted to 5%. The components of each composition are provided in Table 2.

TABLE 2

| | Composition (wt %) | |
|---|---|---|
| Component | 1 | 2 |
| Mineral oil | 76.0 | 76.0 |
| Oleic acid | 6.5 | 6.5 |
| Emulsifier | 6.0 | 6.0 |
| butylatedhydroxy toluene (BHT) | 0.3 | 0.3 |
| Lube ester | 6.2 | 6.2 |
| aminomethyl propanol (AMP) | 1.7 | 1.7 |
| Tolyltriazole | 0.3 | 0.3 |
| p-chloro-m-cresol | 3 | 0 |
| o-phenyl phenol (Dowicide ® 1 reagent) | 0 | 3 |

Two (2) controls were also utilized in this example. Control A contained 1500 ppm of the DOWICIDE® 1 reagent, which contained o-phenylphenol as the biocide and potassium hydroxide to solubilize the biocide. Control B contained 1500 ppm of para-chloro-meta-cresol (PCMC) as the biocide and aminomethyl propanol to solubilize the biocide.

The dilutions were then separately treated using (i) a distillation which mimicked a MVR on a small scale and (ii) a UF filtration unit. The components of the wastewater after distillation/filtration were analyzed initially using a HACH® Test Kit Model PL-1 according to manufacturer's instructions. See, Table 3 for the results of the Hach analysis on the samples treated with distillation and Table 4 for the results of the Hach analysis on the samples treated with filtration.

TABLE 3

| Sample | Amount in sample prior to distillation (ppm) | Amount in collected water phase after distillation (ppm) | Recovery from distillation based on Hach (%) |
|---|---|---|---|
| Control A* | 500 | — | — |
| Control B* | 500 | — | — |

TABLE 3-continued

| Sample | Amount in sample prior to distillation (ppm) | Amount in collected water phase after distillation (ppm) | Recovery from distillation based on Hach (%) |
|---|---|---|---|
| Composition 1 | 460 | 460 | 100 |
| Composition 2 | 500 | 500 | 100 |

*Note that Controls A and B as analyzed by the Hach method have 500 ppm, although actually concentration for these controls was 1500 ppm.

TABLE 4

| Sample | Amount in sample prior to filtration (mg/L) | Amount in sample after filtration (mg/L) |
|---|---|---|
| Composition 1 | 400 | 76 |
| Composition 2 | 700 | 42 |

These preliminary results indicate that recovery of the phenol biocide was better if MVR is performed prior to UF. It is anticipated that other or repeated analyses would show more accurate measurements of the amounts of the biocide in all samples.

Example 4

Isolating Recoverable Materials from Industrial Process Fluid Wastewater

Industrial process fluid wastewater is treated using a OSMONICS® spiral wound PAN (polyacrylonitrile) MW series membrane (GE) UF unit to remove material having a molecular diameter above about 6 nm. The resultant wastewater containing material having a molecular diameter less than about 5 to about 6 nm is then passed through a VACOM™ VCD2000 MVR unit (Vacom) or a similar unit. The resultant wastewater that contains recoverable materials having a boiling point of less than about 200° C. is collected.

All publications cited in this specification are incorporated herein by reference. While the invention has been described with reference to particular embodiments, it will be appreciated that modifications can be made without departing from the spirit of the invention. Such modifications are intended to fall within the scope of the appended claims.

What is claimed is:

1. A process for removing recoverable material from metal working fluid wastewater comprising said recoverable material, said process comprising:
   (i) treating said metal working fluid wastewater comprising recoverable material with ultrafiltration;
   (ii) treating said metal working fluid wastewater comprising recoverable material by mechanical vapor recompression; and
   (iii) collecting the recoverable material;
   wherein said recoverable material (i) comprises water and one or more components of metal working fluid, (ii) has a molecular diameter of about 10 nm to about 100 nm, and (iii) has a boiling point of less than about 200° C.

2. A process for treating a surface with a metal working fluid comprising recoverable material, said process comprising treating a surface using said recoverable material isolated from said process of claim 1.

3. A process for preparing a metal working fluid comprising a recoverable material, said process comprising combining said recoverable material isolated from the process of claim 1 with unprocessed metal working fluid.

4. The process according to claim 1, wherein said recoverable materials are soluble in water, dispersible in water, or azeotrope with water.

5. The process according to claim 1, wherein step (i) is performed prior to step (ii).

6. The process according to claim 1, wherein step (ii) is performed prior to step (i).

7. The process according to claim 1, wherein said recoverable material comprises one or more of an amine.

8. The process according to claim 7, wherein said amine is N,N-diethylethanolamine, methoxypropylamine, or a combination thereof.

9. The process according to claim 1, wherein said recoverable material is one or more of a biocide.

10. The process according to claim 9, wherein said biocide is a phenol.

11. The process according to claim 10, wherein said phenol is p-chloro-m-cresol or o-phenyl-phenol.

12. The process according to claim 1, wherein said recoverable material comprises carboxylic acids, esters, surfactants, fatty acids, or a combination thereof.

13. A method for removing N,N-diethylethanolamine, methoxypropylamine, or a combination thereof from metal working fluid wastewater comprising said N,N-diethylethanolamine, methoxypropylamine, or a combination thereof, comprising:
   (i) treating said metal working fluid wastewater comprising N,N-diethylethanolamine, methoxypropylamine, or a combination thereof with ultrafiltration;
   (ii) treating said metal working wastewater comprising N,N-diethylethanolamine, methoxypropylamine, or a combination thereof by mechanical vapor recompression; and
   (iii) collecting said N,N-diethylethanolamine, methoxypropylamine, or a combination thereof.

14. A method for treating a metal surface with a metal working fluid comprising recoverable material, said method comprising:
   (a) preparing metal working fluid using the recoverable material isolated from said process of claim 1; and
   (b) treating said metal surface.

15. The process according to claim 14, wherein said recoverable material is an amine.

16. The process according to claim 15, wherein said amine is N,N-diethylethanolamine, methoxypropylamine, or a combination thereof.

17. The process according to claim 14, wherein said recoverable material is a biocide.

18. The process according to claim 17, wherein said biocide is a phenol.

19. The process according to claim 18, wherein said phenol is p-chloro-m-cresol or o-phenyl-phenol.

20. The process according to claim 1, wherein said metal working fluid is for rolling metals.

21. The process according to claim 1, wherein said metal working fluid is a metal removal fluid.

22. The process according to claim 21, wherein said metal removal fluid is used in cutting or grinding.

23. The process according to claim 1, wherein said metal is aluminum.

24. The process according to claim 1, wherein said metal is steel.

* * * * *

UNITED STATES PATENT AND TRADEMARK OFFICE
CERTIFICATE OF CORRECTION

| | | |
|---|---|---|
| PATENT NO. | : 8,460,553 B2 | Page 1 of 1 |
| APPLICATION NO. | : 12/666145 | |
| DATED | : June 11, 2013 | |
| INVENTOR(S) | : Burke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this
Thirtieth Day of December, 2014

Michelle K. Lee
*Deputy Director of the United States Patent and Trademark Office*